United States Patent [19]

Login

[11] 4,024,205

[45] May 17, 1977

[54] SYNTHETIC POLYMER COMPOSITION HAVING ENHANCED ANTISTATIC PROPERTIES

[75] Inventor: Robert Bernard Login, Woodhaven, Mich.

[73] Assignee: BASF Wyandotte Corporation, Wyandotte, Mich.

[22] Filed: Dec. 22, 1975

[21] Appl. No.: 643,448

[52] U.S. Cl. .................. 260/857 PG; 260/75 N; 260/858; 260/860; 260/873

[51] Int. Cl.$^2$ .................. C08L 67/06; C08L 77/00

[58] Field of Search ............ 260/857 PG, 862, 873, 260/858

[56] References Cited

UNITED STATES PATENTS

| | | | |
|---|---|---|---|
| 2,922,773 | 1/1960 | Coler | 260/32.6 |
| 3,657,386 | 4/1972 | Weedon | 260/857 PE |
| 3,743,685 | 7/1973 | Grosjean | 260/860 |
| 3,745,141 | 7/1973 | Bonnard | 260/860 |
| 3,772,403 | 11/1973 | Wells | 260/857 PG |
| 3,787,523 | 1/1974 | Crescentini | 260/857 PG |
| 3,787,534 | 1/1974 | Crescentini | 260/857 PG |
| 3,873,639 | 3/1975 | Crescentini | 260/857 PG |
| 3,876,725 | 4/1975 | Wells | 260/857 PG |
| 3,882,190 | 5/1975 | Wells | 260/857 PG |
| 3,887,644 | 6/1975 | Wells | 260/857 PG |

FOREIGN PATENTS OR APPLICATIONS 46-27588  8/1971  Japan

*Primary Examiner*—Paul Lieberman
*Attorney, Agent, or Firm*—Joseph D. Michaels; Bernhard R. Swick; Robert E. Dunn

[57] ABSTRACT

Permanent antistatic properties are imparted to synthetic polymers by incorporating therewith from 1% to 15% by weight of the polymer of a polyoxyalkylated polyol polyester containing ionic groups prepared by the reaction of an alkylene oxide adduct of a nitrogen-containing compound with (1) a metal salt of an acidic derivative of an organic polycarboxylic ester or (2) an alkoxide generating reagent followed by reaction with a polycarboxylic anhydride, anhydride acid chloride, or anhydride ester.

10 Claims, No Drawings

SYNTHETIC POLYMER COMPOSITION HAVING ENHANCED ANTISTATIC PROPERTIES

BACKGROUND OF THE INVENTION

1. Field of the Invention

The present invention relates to antistatic polymer compositions. More particularly, the invention relates to the use of polyoxyalkylated polyol polyesters containing ionic groups as antistatic agents for synthetic polymers.

2. Prior Art

The use of polyoxyalkylated polyols as antistatic agents for synthetic polymers is well known in the art as evidenced by U.S. Pat. Nos. 3,329,557; 3,475,898, and 3,657,386.

In U.S. patent application Ser. No. 177,136 filed Sept. 1, 1971, there is disclosed that the antistatic properties of synthetic polymers can be improved by incorporating therewith polyesters obtained by the reaction of a hydrogen-reactive compound and an alkylene oxide adduct of a nitrogen-containing compound.

The present invention is an improvement in the invention disclosed in the aforesaid application in that it has now been found that polymer compositions containing a polyoxyalkylated polyol polyester containing ionic groups exhibits improved dye-light fastness and antistatic properties.

SUMMARY OF THE INVENTION

In accordance with the present invention, synthetic polymers having permanent antistatic properties imparted thereto are prepared by the addition thereto of a polyoxyalkylated polyol polyester containing ionic groups prepared by the reaction of an alkylene oxide adduct of a nitrogen-containing compound with (1) a metal salt of an acidic derivative of an alkyl ester of an organic polycarboxylic acid or anhydride or (2) an alkoxide-generating reagent followed by reaction with a polycarboxylic anhydride, anhydride acid chloride, or anhydride ester. The polyesters are prepared employing an equivalent ratio of ester group to hydroxyl group of from about 0.25:1 to 0.5:1. The polyesters are the subject of my copending U.S. patent application Ser. No. 642,846 filed on even date herewith. Generally, the amount of polyester employed will be from about 1% to 15% by weight based on the weight of the synthetic polymer.

DESCRIPTION OF THE PREFERRED EMBODIMENTS

The present invention relates to permanent antistatic compositions comprising a synthetic polymer and from 1% to 15% by weight based on the weight of the polymer of a polyester containing ionic groups, said polyester prepared by the reaction of a metal salt of an acidic derivative of an alkyl ester of an organic polycarboxylic acid or anhydride having the formula:

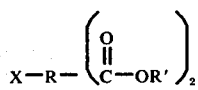   I.

wherein
R is an aliphatic or aromatic radical,
R' is an alkyl group having from 1 to 4 carbon atoms,
X is $SO_3M$, OM, $CO_2M$ or $SO_2M$, and
M is Na, K, Li, Ca, Mg or Ba,
with an alkylene oxide adduct of a nitrogen-containing compound. Optionally, the polyesters may be prepared by the reaction of an aforementioned adduct with an alkoxide-generating reagent such as a pure metal or a metal alcoholate followed by reaction with a compound of the formula:

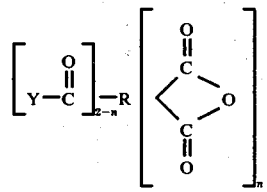   II wherein
R is an aliphatic or aromatic radical,
Y is Cl or alkyl having from 1 to 4 carbon atoms, and
$n = 1$ or 2.

These polyesters generally have a molecular weight ranging from about 25,000 to 500,000 and are thermally stable in nitrogen at temperatures of upwards of about 250° to 350° C. as measured by thermogravimetric analysis.

The nitrogen-containing compound which is oxyalkylated and employed in the preparation of the polyesters of the subject invention is selected from the group consisting of alkanolamines, polyalkanolamines, alkylene polyamines, polyalkylenepolyamines, and aromatic polyamines. Illustrative of such amines include ethanolamine, propanolamine, isopropanolamine, butanolamine; triethanolamine, triisopropanolamine, stearyldiethanolamine, ethylene diamine, hexamethylene diamine, N,N,N',N'-tetrakis(2-hydroxypropyl) ethylene diamine, diethylene triamine, triethylene tetramine; the phenylene diamines, toluene diamines, and aniline/formaldehyde condensation polymers. Among these useful nitrogen-based compounds particularly preferred are those derived from alkylene polyamines, polyalkanolamines and polyalkylene polyamines, and within these classes ethylene diamine, N,N,N'N'-tetrakis(2-hydroxypropyl) ethylene diamine, triethanolamine and triethylenetetramine.

Still another useful class of nitrogen-containing compounds are the higher alkylene oxide adducts of the above-enumerated nitrogen-containing compounds. For purposes of clarity these higher alkylene oxides are hereinafter referred to as α-olefin oxides. The adducts prepared from the α-olefin oxides are generally made by reacting any of the above-enumerated nitrogen-containing compounds under conventional oxyalkylation conditions with the α-olefin oxide. The useful α-olefin oxides are those having from ten to twenty carbon atoms, and preferably from fourteen to eighteen carbon atoms, as well as mixtures thereof.

This class of nitrogen-containing compound is prepared, generally, in a mole ratio of α-olefin oxide to nitrogen-containing compound ranging from about 1:1 to 2:1. Preferred within this class of compounds are the $C_{15}$ to $C_{18}$, or mixtures thereof, adducts of ethanolamine, diethanolamine, and aminoethylethanolamine.

The alkylene oxide used to oxyalkylate the nitrogen-containing or nitrogeneous compound can be either ethylene oxide or a mixture of ethylene oxide and lower alkylene oxides, having from three to four carbon atoms, such as propylene oxide, the butylene oxides, epihalohydrins, and the like wherein the ethylene oxide is present in an amount equal to at least 10% by weight of an alkylene oxide combination. Where a combination of alkylene oxides is employed, the alkylene oxides can be reacted with the nitrogen-containing compound either sequentially or as a random mixture thereof. The alkylene oxides generally constitute from about 60% to 99% by weight of the resulting adduct and, preferably, from about 70% to 98% by weight thereof with the ethylene oxide content of the alkylene oxide ranging from about 10% to 100% by weight of the alkylene oxides and preferably from about 40% to 80% by weight.

The alkylene oxide adducts of the nitrogen-containing compound are prepared under conventional oxyalkylation conditions, e.g. 34 to 90 psi. and at 100° to 115° C. and in the presence of a conventional oxyalkylation catalyst. The alkylene oxide adducts of the nitrogen-containing compound, useful herein besides having the above physical properties, have a molecular weight ranging from about 1,000 to 40,000 and preferably from about 5,000 to 30,000. Particularly suitable alkylene oxide adducts of nitrogen-containing compounds useful in the practice of the present invention are found in U.S. Pat. Nos. 3,207,791 and 2,979,528.

As mentioned above, one of the ingredients employed in the preparation of the polyesters of the subject invention is a metal salt of an acidic derivative of an alkyl ester of an organic polycarboxylic acid or anhydride. Organic polycarboxylic acids and anhydrides which may be employed in the preparation of these salts include aliphatic and aromatic acids and anhydrides such as malonic, succinic, glutaric, adipic, pimelic, suberic, azelaic, sebacic, phthalic, isophthalic, terephthalic, 1,4-cyclohexane dicarboxylic, trimellitic and pyromellitic. The acid group is incorporated into the alkyl esters by, for example, sulfonation, sulfination, carboxylation or hydroxylation.

Generally, the lower alkyl esters of the acids or anhydrides will be employed in the preparation of the polyesters. By the phrase "lower alkyl" is meant alkyl having from one to four carbon atoms. Representative alkyl esters include dimethyl malonate, diethyl adipate, dimethyl azelate; dimethyl maleate, diethyl maleate, dibutyl maleate, diethyl succinate, dibutyl succinate and diethylphthalate.

The preferred alkyl esters of dicarboxylic acids are those derived from iso- and terephthalic acid. Representative of these preferred esters are dimethyl terephthalate, diethyl terephthalate, dimethylisophthalate and diethylisophthalate.

In preparing the polyester, the metal salt is reacted with the nitrogen-containing compound in an equivalent ratio of ester group of the salt to hydroxyl group of the nitrogen-containing compound of 0.25:1.0 to 0.5:1.0 and preferably from about 0.3:1.0 to 0.45:1.0. This reaction is usually conducted in an inert atmosphere, e.g., nitrogen, at a temperature ranging from about 60° to 160° C. and at either atmospheric pressure or a reduced pressure for a time period ranging from about one hour to ten hours. Preferably, the reaction is carried out at a temperature ranging from about 70° to 150° C. and for a period ranging from about one hour to four hours.

As mentioned above, the polyesters of the subject invention may also be prepared by reacting the nitrogen-containing compound with an alkoxide generating reagent and subsequently reacting with a compound of Formula II above, namely a polycarboxylic anhydride, anhydride acid chloride or anhydride ester. Representative alkoxide generating reagents include the metals of Group I and II such as sodium, potassium, lithium, barium, magnesium and calcium, as well as alcoholates of all of these metals. Particularly preferred are the alcoholates of lower aliphatic alcohols such as methanol, ethanol, the propanols and the butanols. Representative polycarboxylic anhydrides which may be used include 1,2,4,5-benzene tetracarboxylic dianhydride, 1,2,3,4-benzene tetracarboxylic dianhydride, 3,3',4,4'-benzophenone tetracarboxylic dianhydride, 1,4,5,8-naphthalene tetracarboxylic dianhydride, bicyclo[2,2,2]oct-7-ene-2,3,5,6-tetracarboxylic-2,3,5,6-dianhydride, 1,2,3,4-cyclobutane tetracarboxylic dianhydride, 1,2,3,4-cyclopentane tetracarboxylic dianhydride, and tetrahydrofuran-2,3,4,5-tetracarboxylic dianhydride. Representative anhydrides and chlorides include trimellitic anhydride acid chloride and hemimellitic anhydride acid chloride. Representative anhydride esters include alkyl ester of trimellitic anhydride and alkyl ester of hemimellitic anhydride. Generally the amounts of reactants employed are equivalent to the acid generated during opening of the anhydride, or other acid-forming cross-linking functionality.

In preparing these polyesters a catalyst may be employed. Suitable catalysts are either transesterification catalysts which include, for example, sodium hydroxide, potassium hydroxide, and the like, or isocyanate reaction catalysts which are the conventional organometallic catalysts, such as dibutyltin dilaurate and stannous octoate. The catalyst will nominally be employed in catalytic amounts ranging from about 0.01 part to 0.2 part per 100 parts by weight of reactants. Where a transesterification catalyst is employed, it is incumbent to neutralize any residual amounts thereof by known conventional procedures after cessation of the reaction.

The resulting products will range from either a viscous liquid to a hard wax. The hard wax upon subjecting to heat or elevated temperatures, will transform to a highly viscous liquid which for illustrative purposes will have a viscosity at 100° C. ranging from about 200 cps. to about 40,000 cps., the same viscosity range being applicable to the viscous liquid products.

As mentioned above, the antistatic compositions of the present invention comprise a synthetic polymer. Any of the well known synthetic polymers that exhibit a static charge may be employed in the subject invention. Representative polymers include polyamides, polyolefins, polyacrylics, polysulfonamides, polyesters, polyurethanes, polycarbonates, polyacetals and polysulfides. Polyamides are the preferred synthetic polymers of use in the present invention. These polyamides are generally prepared from polymerizable monoamino monocarboxylic acids, from the amide-forming derivatives thereof such as caprolactam and from suitable diamines, dicarboxylic acids and amide-forming derivatives of these compounds. Typical of such polyamides is the reaction product of hexamethylene diamine and adipic acid (NYLON 66).

The synthetic polymers prepared in accordance with the subject invention may be in the form of fibers, films, filaments, molded objects and coatings. The antistatic agent may be incorporated into the polymer in any conventional manner such as directly into a polymer melt prior to spinning a filament. It may be necessary to incorporate a minor amount of an antioxidant into the antistat to prevent damage to the fiber-forming polymer when the antistat is added to the melt. Such antioxidants are usually of the hindered phenol type and their use with antistats is well documented. It may also be incorporated at the monomer stage in the polymer preparation since the present antistatic agents do not interfere with polymer formation. Furthermore, the antistatic agent may be incorporated into the polymer in any conventional form, such as in solid or molten form or in a solvent in which both the agent and polymer are soluble, i.e., trifluoroethanol. Polymers treated in accordance herewith, and which are usually employed in the preparation of carpets and textile products, are rendered permanently antistatic in charge. Moreover, they demonstrate exceptional thermal stability and dye-light fastness as recorded on the Gray scale.

Although antistatic agents are efficacious with the polymers hereinbefore defined, owing to the peculiar nature of the synthetic polyester polymers, it is somewhat disadvantageous to introduce into a polyester melt any remaining unreacted hydroxyl groups. Thus, to render the antistatic agents particularly useful with polyester polymers, and to minimize interaction with the polyester, it is contemplated that the polymeric antistatic agent composition hereof be subsequently reacted with an aromatic carboxylic acid or an ester thereof. This latter reaction generally proceeds at a temperature ranging from about 80° c. to 180° C. for a period ranging from about one hour to six hours. Preferably, the reaction proceeds at a temperature ranging from about 100° to 150° C. for a period ranging from about one hour to two hours. The acid or ester is employed in an amount ranging from about 0.5 mole to 4 moles per equivalent of hydroxyl groups in the antistatic polymer.

In the Examples which follow, the surface resistivity of the polymers was evaluated employing a Keithley apparatus at 10%, 20% and 30% relative humidity. The apparatus consists of an electrometer (Model 610C), a power supply (Model 240A), and a resistivity adapter (Model 610S). In addition, an automatic relative humidity control system was employed. The resistivity values of the compositions are obtained by measuring resistance and converting it to surface resistivity. This is accomplished with an electrode configuration into which a sample is inserted. The resistance measurement is facilitated by applying a potential to the sample and determining the resultant current.

The surface resistivity is calculated as follows:

$$\sigma = P/g\ R$$

where
R is the surface resistance in ohms,
P is the effective perimeter of the guarded electrode for the particular electrode arrangement employed, and
g is the distance between electrodes.

In the Examples which follow, all parts are by weight unless otherwise indicated.

EXAMPLES I-V

A. Preparation of Polyester Antistats

I. A reactor equipped with a thermometer, stirrer, distillation apparatus and heat exchange means was charged with 1334 parts (0.11 mole) of a polyol having a molecular weight of 12,000, an ethylene oxide content of 60% by weight of the polyol and a propylene oxide content of 40% by weight of the polyol, said polyol prepared by the reaction of ethylene oxide with the propylene oxide adduct of ethylene diamine. The charge was heated to 100° C., placed under vacuum and the temperature increased to 120° C. After stripping the charge for fifteen minutes at less than 10 mm. of mercury, the vacuum was relieved with nitrogen. Thereafter 28.5 parts (0.1 mole) of dimethyl 5-sulfoisophthalate sodium salt was added to the charge and the temperature of the charge was raised to 160° C. After an eight-hour period the resulting mixture was filtered to remove the unreacted salt. The product, hereinafter referred to as Antistat I, had a hydroxyl number of 11 and a Brookfield viscosity at 100° C. of 32,000 cps.

II. Following the procedure described above, a polyester was prepared from 929 parts (0.12 mole) of a polyol having a molecular weight of 7600, an ethylene oxide content of 70% by weight of the polyol and a propylene oxide content of 30% by weight of the polyol, said polyol prepared by the reaction of propylene oxide with the ethylene oxide adduct of N,N,N',N'-tetrakis(2-hydroxypropyl) ethylene diamine and 30 parts (0.1 mole) of dimethyl 5-sulfoisophthalate sodium salt. The resulting polyester, hereinafter referred to as Antistat II, had a hydroxyl number of 18 and a Brookfield viscosity at 100° C. of 12,000 cps.

III. To a reaction vessel equipped as described in I, above, was charged 2500 parts of an alkoxylated nitrogen-containing compound prepared by reacting a mixture of $C_{14}$–$C_{16}$ α-olefin oxides, the mixture containing about 25% $C_{14}$, 50% $C_{15}$, 25% $C_{16}$ with ethanolamine in a 2:1 mole ratio under conventional oxyalkylation conditions followed thereafter by base catalyzed ethoxylation of the olefin oxide-diethanolamine condensate. This alkoxylated nitrogen-containing compound has a molecular weight of about 2600 and contains about 80% by weight of ethylene oxide.

To the unneutralized above intermediate at 160° C. under nitrogen was added 257.5 parts of dimethyl 5-sulfoisophthalate sodium salt. The pressure was reduced thereafter to at least 5 mm. of mercury. Methanol evolution began immediately and was complete in five hours. The viscosity of the mixture increased as methanol was removed until it had finally reached 29,000 cps. as measured on a Brookfield viscometer, spindle No. 4, 30 rpm., at 100° C.

The final product, hereinafter referred to as Antistat III, was a light tan solid melting between 25° –30° C. and exhibiting a hydroxyl number of 26 and a melt viscosity at 100° C. of 29,000 cps.

IV. A reactor was charged with 1000 parts of a polyol having a hydroxyl number of 25, a molecular weight of 8900, an ethylene oxide content of 55% by weight of the polyol and a propylene oxide content of 45% by weight of the polyol, said polyol obtained by the reaction of propylene oxide with an ethylene oxide adduct of N,N,N',N'tetrakis(2-hydroxypropyl) ethylene diamine. The charge was heated to 160° C. and vacuum stripped at less than 5 mm. of mercury for 30 minutes. The vacuum was relieved with nitrogen and 31.5 parts of dimethyl 5-sulfoisophthalate sodium salt was added to the charge. The reaction mixture was sealed and evacuated to 5 mm. of mercury. Methanol evolution began immediately and lasted for four hours. As methanol was removed, the viscosity of the mixture increased. The resulting product, a light tan solid, hereinafter referred to as Antistat IV, had a melting point of 30°–35° C., a hydroxyl number of 16, and a melt viscosity at 100° C. of 35,500 cps.

V. A reactor was charged with 1000 parts of a polyol having a hydroxyl number of 22, a molecular weight of 10,200, an ethylene oxide content of 40% by weight of the polyol and a propylene oxide content of 60% by weight of the polyol, said polyol obtained by the reaction of propylene oxide with an ethylene oxide adduct of N,N,N',N'-tetrakis(2-hydroxypropyl) ethylene diamine. The charge was heated to 160° C. and vacuum stripped at less than 5 mm. of mercury for 30 minutes. The vacuum was relieved with nitrogen and 25.9 parts of dimethyl 5-sulfoisophthalate sodium salt was added to the charge. The reaction temperature was raised to 160° C. and the reaction continued for about one hour. The product was then stripped at 160° C., removing methanol for about four hours. The resulting product, hereinafter referred to as Antistat V, had a hydroxyl number of 14.4 and a melting point at 100° C. of 4300 cps.

B. Preparation of Antistatic Polymer Compositions

The improved antistatic properties imparted to polypropylene fiber in accordance with the subject invention were determined in the following manner. Polypropylene fiber was mixed with 1% by weight of the antistatic agents prepared above and extruded into filaments. The filaments were placed between the two electrodes. The desired test potential was selected from the voltage supply and the current passing through the test sample was measured by an electrometer. From the reading of the voltage supply and the electrometer the resistivities were computed. The results are presented in Table I, below.

TABLE I

| Sample | Resistivity in Ohms | | |
|---|---|---|---|
| | 10% RH | 20% RH | 30% RH |
| Polypropylene | $2.4 \times 10^{14}$ | $3.7 \times 10^{14}$ | $3.7 \times 10^{14}$ |
| Polypropylene + Antistat Agents I | $1.1 \times 10^{14}$ | $6.0 \times 10^{13}$ | $1.0 \times 10^{13}$ |
| Polypropylene + Antistat Agent II | $2.4 \times 10^{13}$ | $1.1 \times 10^{13}$ | $7.3 \times 10^{12}$ |
| Polypropylene + Antistat Agent III | $1.6 \times 10^{12}$ | $1.0 \times 10^{12}$ | $2.8 \times 10^{11}$ |
| Polypropylene + Antistat Agent IV | $7.4 \times 10^{9}$ | $4.3 \times 10^{13}$ | $2.8 \times 10^{13}$ |
| Polypropylene + Antistat Agent V | $1.1 \times 10^{14}$ | $1.2 \times 10^{12}$ | $1.2 \times 10^{12}$ |

RH = Relative Humidity

EXAMPLE VI

This Example illustrates the improved antistatic properties imparted to polyamide polymers in accordance with the subject invention. Chips of fiber grade NYLON 6 polycaprolactam were dissolved in 2,2,2-trifluoroethanol. To the solutions of the polyamide polymer in solvent were added 5% by weight based on the weight of polymer of Antistat III and Antistat IV. Thereafter approximately ten milliliters of solution was poured into a Petri dish and the solvent evaporated. Upon evaporation of the solvent, films of about five mils thickness resulted. The films are adjusted to a diameter of three inches and placed into a humidity and temperature control box to achieve equilibrium with specified conditions of humidity and temperature. Thereafter the surface resistivity of the samples was calculated. The results are presented in Table II, below.

TABLE II

| Sample | Resistivity in Ohms | | |
|---|---|---|---|
| | 10% RH | 20% RH | 30% RH |
| NYLON 6 | $8.2 \times 10^{14}$ | $1.2 \times 10^{15}$ | $1.9 \times 10^{14}$ |
| NYLON 6 + 5% Antistat III | $1.1 \times 10^{14}$ | $3.3 \times 10^{13}$ | $7.3 \times 10^{12}$ |
| NYLON 6 + 5% Antistat IV | $3.2 \times 10^{13}$ | $5.8 \times 10^{12}$ | $2.9 \times 10^{12}$ |

EXAMPLE VII

A. Preparation of Polyester Antistat VI

To a reactor equipped as described above was charged 1100 parts (0.092 moles) of the polyol described in Example I and 3.7 parts (0.07 mole) of sodium methoxide. The charge was heated to 100° C. and placed under a vacuum to remove methanol. The charge was heated to 120° C. and 13 parts (0.062 mole) of trimellitic anhydride acid chloride was then added thereto. The temperature of the charge was raised to 140° C. and the charge was vacuum distilled to remove volatiles. The resulting polyester had a Brookfield viscosity at 100° C. of 7000 cps.

B. Preparation of Polyester Antistat VII

To a reactor was charged 1503 parts (0.58 mole) of an alkoxylated nitrogen-containing compound having a molecular weight of about 2600 and an oxyethylene content of 80% by weight, said compound prepared by ethoxylation of the adduct of one mole of ethanolamine and two moles of a mixture of $C_{15}$–$C_{18}$ α-olefin oxides, said mixture containing 20% $C_{15}$, 30% $C_{16}$, 30% $C_{17}$ and 20% $C_{18}$ olefin oxides. The charge was mixed with 54.4 parts (1.03 mole) of sodium methoxide heated to 120° C. and placed under vacuum to removal methanol. Thereafter, 110 parts (0.43 mole) of pyromellitic anhydride was added to the charge and the reaction was continued at 120° C. for 1 hour. The resulting polyester was a viscous gel-like material.

C. Preparation of Antistatic Polymer Compositions

Following the procedure described in Example VI, the antistatic properties of polyamide filaments are improved by incorporating therewith 1%, 5% and 15% by weight based on the weight of the filament of Polyester Antistats VI and VII. The resulting compositions demonstrate improved antistatic properties of the magnitude exhibited in the previous Example.

The embodiments of the invention in which an exclusive property or privilege is claimed are defined as follows:

1. An antistatic composition comprising a synthetic polymer and from 1% to 15% by weight based on the weight of the polymer of a polyoxyalkylated polyol polyester containing ionic groups, said polyester prepared by the reaction of an alkylene oxide adduct of a nitrogen-containing compound having a molecular weight from about 1,000 to 40,000 and an alkylene oxide content of from about 60% to 90% by weight, said alkylene oxide content being at least 10% by weight ethylene oxide, with (a) a metal salt of an acidic derivative of an alkyl ester of an organic polycarboxylic acid or anhydride or (b) an alkoxide-generating reagent followed by reaction with a polycarboxylic anhydride, anhydride acid chloride or anhydride ester, employing an equivalent ratio of ester group to hydroxyl group of from about 0.25:1 to 0.5:1.

2. The composition of claim 1 wherein (a) is a compound of the formula:

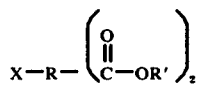   I.

wherein
R is an aliphatic or aromatic radical,
R' is an alkyl group having from 1 to 4 carbon atoms,
X is $SO_3M$, OM, $CO_2M$ or $SO_2M$, and
M is Na, K, Li, Ca, Mg or Ba.

3. The composition of claim 1 wherein (b) is a compound of the formula:

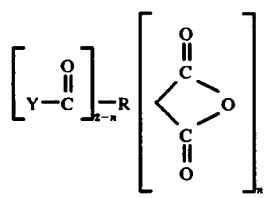   II.

wherein
R is an aliphatic or aromatic radical,
Y is Cl or alkyl having from 1 to 4 carbon atoms, and
$n = 1$ or 2.

4. The composition of claim 1 wherein (a) is the sodium salt of dimethyl 5-sulfoisophthalate.

5. The polyester of claim 1 wherein the alkylene oxide adduct of a nitrogen-containing compound is a propylene oxide adduct of the condensation of ethylene oxide with N,N,N',N'-tetrakis(2-hydroxypropyl) ethylene diamine.

6. The polyester of claim 1 wherein the adduct constitutes from about 40% to 80% by weight of ethylene oxide.

7. The polyester of claim 1 wherein the adduct has a molecular weight of from about 5,000 to 30,000.

8. The polyester of claim 1 wherein the nitrogen-containing compound is selected from the group consisting of alkanolamines, polyalkanolamines, alkylene polyamines, polyalkylenepolyamines and aromatic polyamines.

9. The composition of claim 1 wherein the synthetic polymer is a polyamide.

10. The composition of claim 1 wherein the synthetic polymer is polypropylene.

* * * * *